Figure 8:
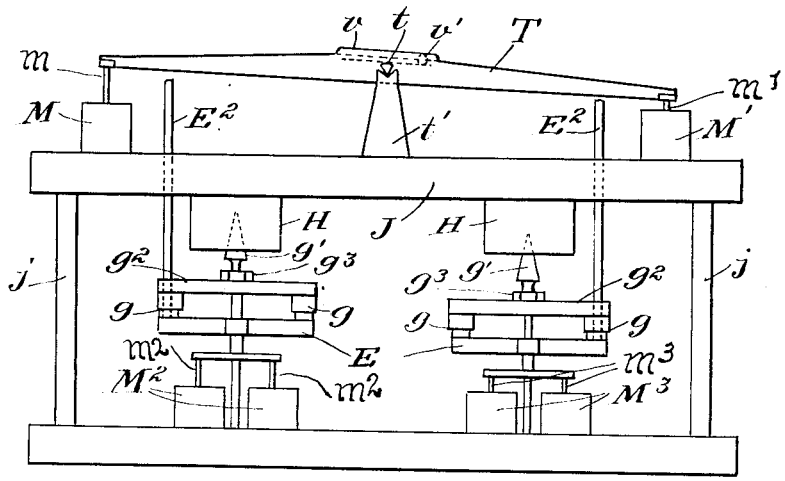

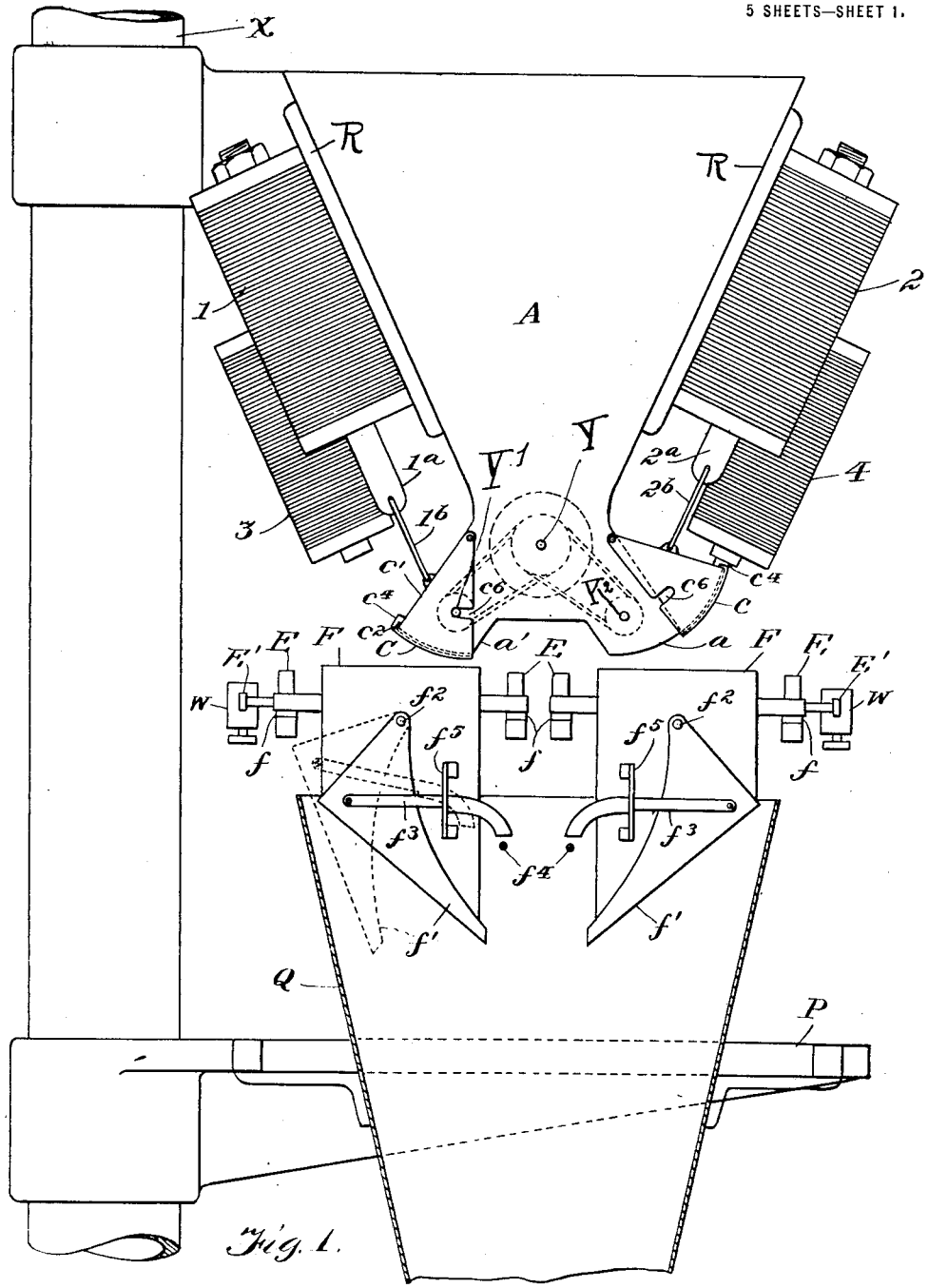

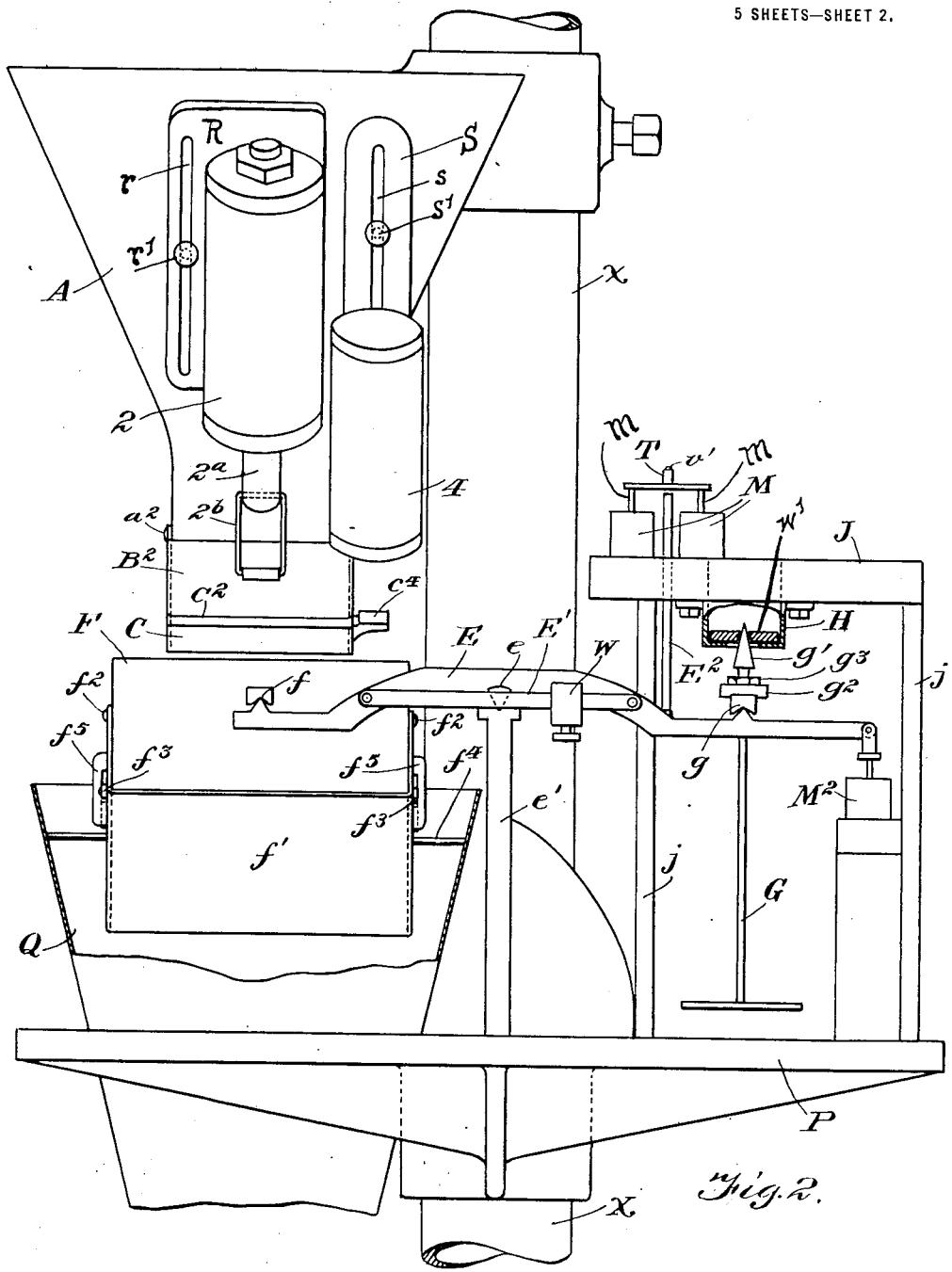

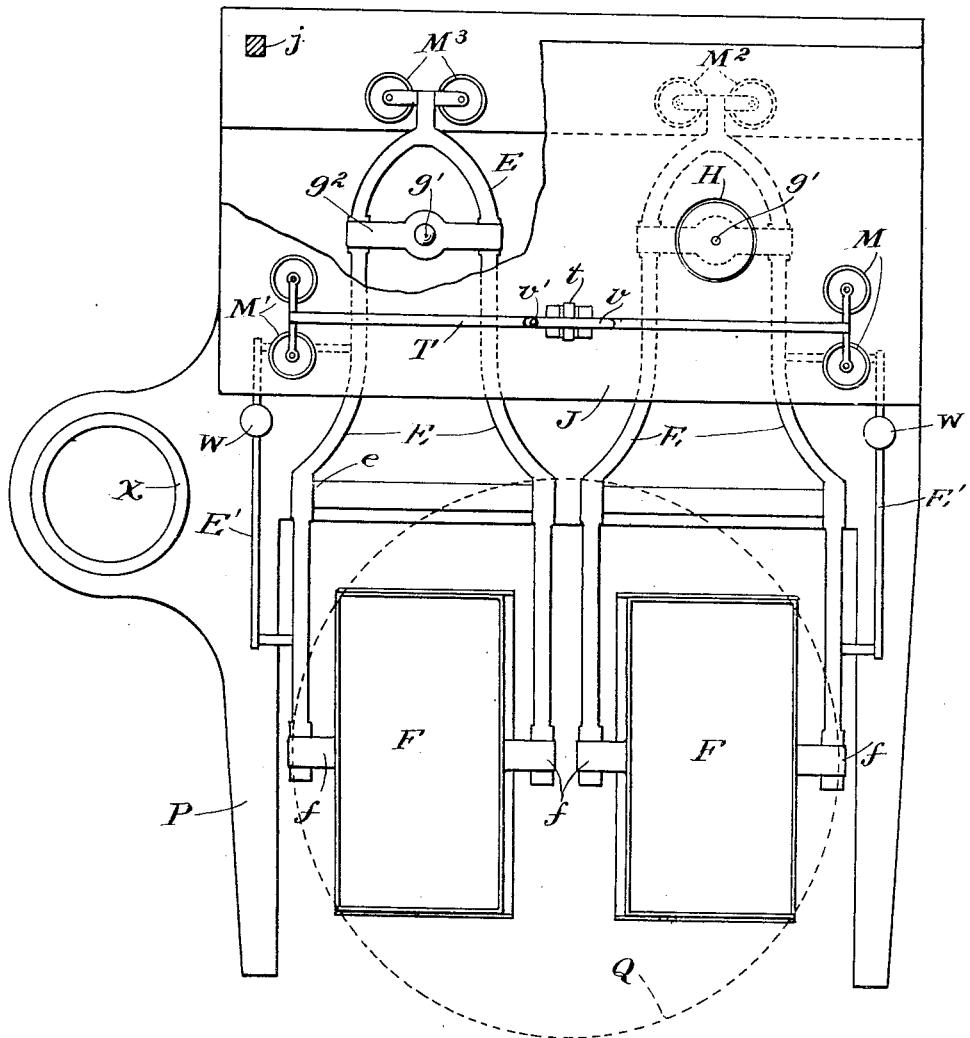

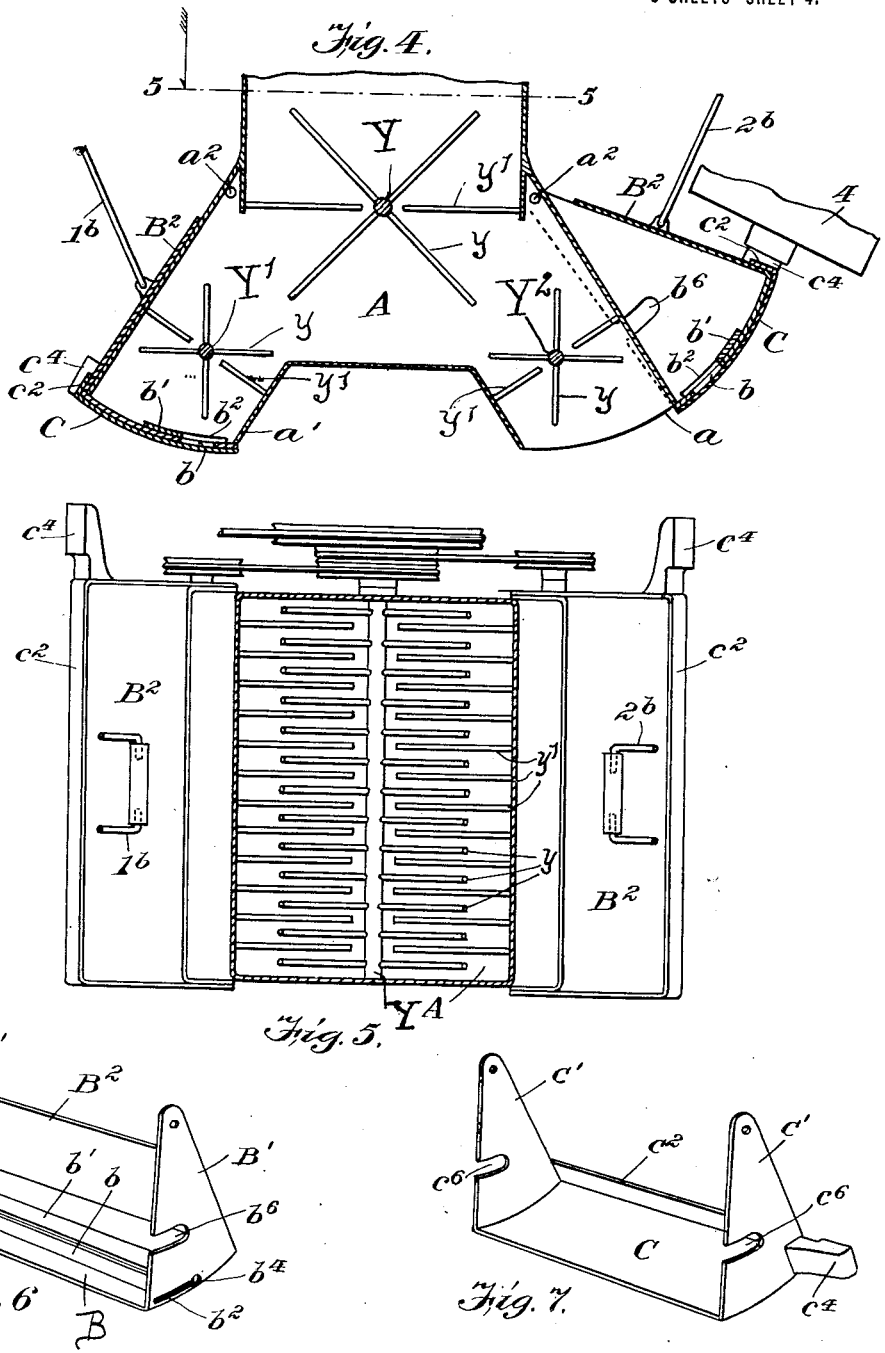

H. S. WEYANT.
AUTOMATIC WEIGHING MACHINE.
APPLICATION FILED JAN. 20, 1911.

1,175,573.

Patented Mar. 14, 1916.
5 SHEETS—SHEET 5.

Witnesses:
S. M. Holmes
Frederick P. Randolph

Inventor:
Harry Spencer Weyant
By his Attorney,
Jos. F. O'Brien

UNITED STATES PATENT OFFICE.

HARRY SPENCER WEYANT, OF YONKERS, NEW YORK.

AUTOMATIC WEIGHING-MACHINE.

1,175,573.  Specification of Letters Patent.  Patented Mar. 14, 1916.

Application filed January 20, 1911.  Serial No. 603,643.

*To all whom it may concern:*

Be it known that I, HARRY SPENCER WEYANT, a citizen of the United States, and residing at Yonkers, in the State of New York, have invented certain new and useful Improvements in Automatic Weighing-Machines, of which the following is a specification.

This invention relates to improvements in automatic weighing machines and particularly to that type of machine in which a predetermined proportion of the total weight desired is first delivered to a scale pan by means of a main stream and then the ultimate weight is completed by a supplementary or drip stream.

According to my invention, I am enabled instantaneously to reduce a main stream of adjustable and predetermined proportion to a drip stream of adjustable and predetermined volume. By the use of my invention, I can thus procure great accuracy and rapidity of operation. I can with equal rapidity and accuracy weigh a large number of different kinds of substances and can also accurately and rapidly weigh considerably varying quantities of such substances.

My invention furthermore comprises the combination and arrangement of parts hereinafter more particularly specified and pointed out in the appended claims.

In the accompanying drawings in which similar reference characters designate corresponding parts throughout the several views—

Figure 9:
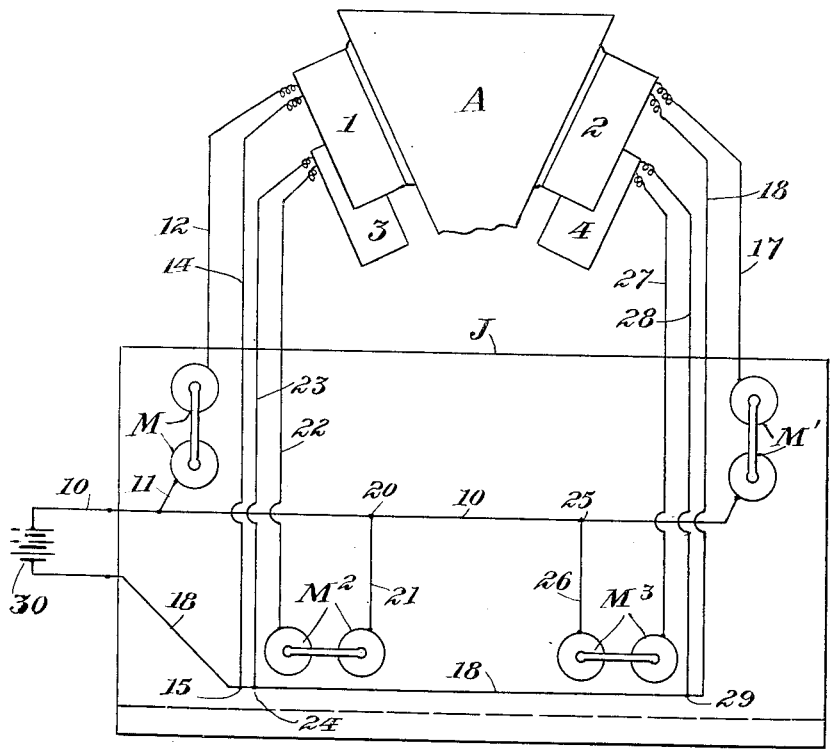

Figure 1 is a front elevation of a machine embodying my invention; Fig. 2 is a side view thereof; Fig. 3 is a plan view of the same; Fig. 4 is an enlarged view of the funnel spout and accompanying parts shown in Fig. 1; Fig. 5 is a section on the line 5—5 of Fig. 4, looking in the direction of the arrow; Figs. 6 and 7 are details of the valves for controlling the feed through the spout; Fig. 8 is a side elevation of the device employed by me in double machines to prevent the scale pans from racing; and Fig. 9 is a diagrammatic view of the electrical connections employed.

Referring now to these drawings, which illustrate a preferred form of construction, I provide a suitable support, such as the standard X, for supporting the scale and coöperating mechanism.

As illustrated, a hopper A is provided with two discharge spouts $a$ $a'$ adapted to deliver to two suitable scales. I have no desire however to limit my invention to a machine employing two scales as it is obvious that by merely omitting certain parts my invention may be employed with a single scale.

The scales are in all respects identical and it will therefore, only be necessary to describe one scale. Similarly, the valve mechanism for controlling the feed through one spout is identical with the mechanism for the other spout and I will therefore simply describe one set of valves.

Any suitable scale or scales may be employed. As shown, the scale comprises a balance or scale beam E mounted on suitable knife edge bearings $e$ on the standard $e'$. Mounted at one end of the scale beam on suitable knife edge bearings $f$ is a scale pan F and a suitable weight rod G is similarly mounted on bearings $g$ at the other end. The scales are preferably mounted on a platform P supported by the standard X.

Each scale pan F is preferably provided with a drop bottom or scoop valve $f'$ hinged at both sides of the pan on pivots $f^2$ to normally close by gravity. This hinged scoop valve is preferably provided with an arm $f^3$ adapted to project through slots formed between suitable lugs $f^5$ and the pan. The arm $f^3$ is provided with a notch $f^6$ best shown in dotted lines in Fig. 1 which is adapted to engage the lug $f^5$ and lock the scoop valve. Both scale pans preferably deliver to a common delivery spout Q, also preferably supported on the platform P.

The weight rod G is mounted on knife-edge bearings $g$ and extends downwardly so as to receive a weight to compensate for the proportion of the entire load which it is desired to deliver by means of the main stream. The upper end of the said rod G is preferably provided with a cone $g'$ adjustably mounted by means of screw and nut $g^3$ on the plate $g^2$. The upper end or apex of the cone $g'$ is adapted to enter through the center of a suitable supplementary weight holder or compartment H supported in a platform J, which is supported in turn on standards $j$ $j$, extending upwardly from the platform P. A supplementary weight $w'$ within the holder H is so held in relation to the cone $g'$ as to be picked up by said cone $g'$ when the load delivered to the scale pan is sufficient to overcome the weight on the weight rod G and the pan begins its downward movement, and this supplementary weight will compensate for the material to be delivered by the drip feed as hereinafter described.

I will now describe my valve mechanism for controlling the feed through the spouts $a$ $a'$. For this purpose, I preferably employ two valves for closing each spout opening, which valves I shall hereinafter designate as a "main valve" and an "auxiliary valve." The main valve, when closed over the spout, only partially shuts off or reduces the feed therethrough, that is to say, it still permits a reduced flow or "drip" stream, and the auxiliary valve is adapted to completely cut off this "drip" stream.

As illustrated, a main valve B and an auxiliary valve C are so hinged or pivoted at both sides of each spout that the respective body or bottom portions thereof will fall by gravity directly over the spout opening, the body or bottom portion of the auxiliary valve C falling directly beneath the main valve B, and the said two valves together completely closing the spout opening as clearly shown in Figs. 1 and 4 at the left thereof. Both the main valve B and auxiliary valve C have upwardly-projecting portions B' and C' at each side. These upwardly projecting portions are pierced with suitable orifices and pivoted on common pivots $a^2$ at each side of the spout.

Each main valve has a centrally located aperture $b$ in its body or bottom portion, the size of which aperture may be varied at the will of the operator by means of a plate $b'$ mounted to slide in slots $b^2$ $b^3$ in the side edges of the valve and adapted to be secured in any desired position with relation to the aperture by means of set screws $b^4$ or other suitable device. In this way, the main feed through the spout may be reduced by the closing of the main valve B to a drip stream of predetermined volume. As shown, each main valve B is also provided with a rear wall $B^2$ extending upwardly from the body or bottom thereof. When the valve B closes, the wall $B^2$ will abut against the wall of the spout and limit the movement of the valve. This wall also forms a convenient point for attachment of the operating mechanism. The auxiliary valve C is also provided at its rear edge with a portion $C^2$ extending upwardly a short distance to engage the rear wall of the main valve when its closing movement is completed. It is obvious that, when the main valve is opened, the auxiliary valve C will be dragged open with it, and furthermore, if the main valve be first closed to reduce the feed to a predetermined drip stream, as aforesaid, the subsequent closing of the auxiliary, which falls by gravity over the main valve, will cut off the drip stream through the aperture $b$ of the main valve.

Suitable means is provided for opening both the main valve and the auxiliary valve simultaneously and for closing the same successively, and I preferably employ electro-magnetic means for this purpose. When two scales are employed, the last mentioned means will be duplicated for each set of valves.

As shown, I provide solenoids 1 and 2 for alternately opening the two sets of valves controlling the flow through the spouts $a$ $a'$ respectively, the cores $1^a$ $2^a$ being connected to the rear walls of the main valves by means of links $1^b$, $2^b$. Each of such solenoids is preferably mounted on a plate R adjustably secured to the side of the hopper in any suitable manner, such as by the slot $r$ and screw and nut $r'$ or other suitable means, to permit vertical adjustment of the solenoids relatively to the valves. This adjustment of the solenoids relatively to the valves makes it possible to vary the volume of the main stream as desired. Thus, if the valves are opened only a portion of the entire distance, the main stream from the spout will obviously be smaller than if the solenoid be set in position at the upper end of the plate R to pull the valves all the way open to obtain a spout opening of full size. This method of adjustment is much more desirable than limiting the movement of the core with relation to the coil of the solenoid.

Suitable electromagnets 3 and 4 are preferably provided for retaining the auxiliary valves C in open position when such valves are moved into contact therewith by the solenoids. These magnets are likewise similarly mounted in adjustable relation to the valves C by any suitable means, such as the plate S having the slot $s$ coöperating with the screw and lock nut $s'$, whereby these magnets may be adjusted to correspond with the adjustments of the solenoids.

The valve-operating solenoids and magnets are preferably controlled by suitable switches actuated by the movement of the scale, the switches controlling the solenoids being opened up by the upward movement of the weight end of the scale beam when the load in the scale pan has reached a sufficient weight to compensate for the weight on the weight rod G, and the switches controlling the magnets being opened up by the final upward movement of the weight end of the scale beam so soon as the load in the scale pan is sufficient to compensate for or balance both the weight on the rod and the supplemental weights $w'$ in the weight holder H.

As shown, four pairs of mercury cups M, M', $M^2$ and $M^3$ are connected up in a suitable circuit, the two members of each pair acting as the terminals of a switch, and the circuit across these terminals is opened up and closed by connecting rods $m$ $m$; $m'$ $m'$; $m^2$ $m^2$; $m^3$ $m^3$; arranged in pairs and suitably yoked together and operated by the movement of the scale to move vertically within the mercury cups to connect and disconnect with the mercury therein.

When my invention is used in connection with two scales some form of anti-racing device should preferably be employed. My preferred anti-racing device comprises, as clearly shown in Figs. 3 and 8, a balance beam T mounted by means of suitable knife-edge bearings $t$ on a suitable standard or support $t'$ and adapted as shown in said Fig. 8 to contact or be alternately engaged and moved by projections $E^2$ carried by the scale beams E, so as to alternately open and close the circuits to the solenoids 1 and 2, thereby energizing and deënergizing the same to alternately pull open and drop the valves at opposite sides of hopper.

The beam T is preferably provided with a suitable counterpoise device to independently continue the movement of the beam after its initial upward movement by the scale so that the final or finishing weighing movement or stroke of the scale will be entirely free from obstruction and great accuracy may be obtained. The counterpoise device shown in the drawings (Figs. 3 and 8) comprises a slot or groove $v$ and ball $v'$ moving therein and adapted, when one end of the beam T is moved upwardly a slight distance by the initial upward movement of the scale, to roll to the opposite side of the pivoted point of the beam and bear down on said opposite side, thus elevating that end of the beam initially moved. The elevation of this end of the beam T, moves the rods connected thereto out of the mercury in the cups, thus disconnecting the switch at that end, which deënergizes the solenoid and drops the main valve controlling the main feed or stream to that scale which caused the initial elevation. The scale at that side then, freely and without obstruction continues its upward movement until the drip stream flowing through the aperture in the main valve compensates for or balances the supplemental weight $w'$. So soon as this occurs the rods are moved out of the mercury in the cup switches, the circuit to the magnet is opened, the magnet is deënergized and the auxiliary valve is dropped to entirely cut off the feed.

Simultaneously with the deënergizing of the solenoids at one side and the consequent dropping of the main valve at that side, and while the magnet at that side is still energized and holds the auxiliary valve open to complete the load to the scale pan, the beam T connects the circuit across the switch at the opposite side to energize the opposite solenoid and pull open both the main and auxiliary valves controlling the feed to the scale on said opposite side. In this way, the entire or full stream is running on one side while the reduced drip or finishing stream is completing the load at the other side. Any other suitable counterpoise device that will act quickly to move the beam after its initial movement by the scale will however suffice.

It is desirable to provide suitable agitating devices to prevent caking when handling hygroscopic substance and to procure a steady flow through the spouts. As illustrated these agitators comprise three horizontal shafts Y, Y', $Y^2$, each provided with suitable arms $y$ for stirring the material. The shaft Y is mounted in the hopper so that its arms when rotated will stir the material as it is delivered from the hopper to the spouts and the shaft Y' and $Y^2$ are mounted in the sides of the respective spouts so that the arms thereof, will, when rotated stir the material as it comes from the spout. Said agitators are operated from any suitable source of power (not shown).

In connection with these agitators, I preferably provide at each side of the delivery spout, a series of inwardly extending arms $y'$ between the arms of the agitating device and forming a comb for breaking up or combing out any material that might possibly cake between the arms $y$ $y$.

As shown, the valves B and C are provided with cut out portions $b^6$ and $c^6$ to permit same to close over the agitator shafts.

The circuit for the solenoid 1 is from the battery through lines 10 and 11, over mercury cup switch M and through line 12 to the said solenoid 1 thence through the same and back through line 14, contact point 15, line 18, to the battery. The circuit for solenoid 2 is by way of line 10 across the mercury cup switch M', through line 17 to the said solenoid, through the solenoid 2 and thence back through line 18 to the battery. The circuit to the magnet 3 is through the line 10 to contact point 20, through line 21 across the mercury cup switch $M^2$, through the line 22 to the magnet, thence through the said magnet 3, line 23, contact point 24, line 18 to the battery. The circuit for the magnet 4 is from the battery through line 10 to contact point 25, through line 26, over mercury cup switch $M^3$, through line 27 to the magnet, through the magnet and return through line 28, contact point 29, line 18 to the battery.

The scales E are each preferably provided with a supplemental scale beam E' upon which is mounted a suitable slotted weight $w$, adapted to slide on the supplemental beam E' to either side of the pivoted point of the scale beam E. This supplemental beam permits a nice adjustment of the parts of the scale. The operation of the said machine is as follows: Assuming that the scales are properly weighted and both scale pans are in a position beneath the spouts to receive loads, the magnets will be energized so soon as the connection with the battery or other suitable source of power is made. The balance beam T will be depressed at one side and the connecting rods secured thereto will be in connection with and immersed in the mercury in the cups at one side only. This will cause the solenoid at that side to open both the main and auxiliary valves, and the latter coming into contact with the energized magnet at that side will be independently retained in open position thereby. The valves at one side now being open, a load is delivered through the spout to the scale pan equivalent to the weight on the weight rod G and the weight end of the scale beam will move upwardly until the cone $g'$ picks up the supplemental weight in the holder G. Such initial upward movement of the scale causes the projection $E^2$ carried by the scale to come into contact with and move the depressed end of the balance beam T a short distance upwardly, whereupon its counterpoise device will complete the upward movement of said beam and move it out of the way of the further upward movement of the scale beam. The upward movement of this initially depressed end of the beam T then raises the rods connected with it out of the mercury in the cups, thus disconnecting the circuit and deënergizing the solenoid at that side, whereupon the main valve will close by gravity and reduce the feed to a drip stream which will continue to flow through the centrally-disposed adjustable aperture therein. The upward movement of one end of the beam T will, of course, simultaneously depress the other end to which the connecting rods for closing the circuit across the switch to the opposite solenoid are connected. The downward movement of these rods by said beam into the mercury in the mercury-cup switch energizes the opposite solenoid to open the valves and deliver the full stream to the opposite scale. While the full stream is thus being delivered to the opposite scale, the drip or reduced feed is being delivered to the first scale, and this reduced feed continues until the supplemental weight which has been picked up by the cone $g'$ as aforesaid has been compensated for, whereupon the scale pan descends, the arms $f^3$ which are pivoted to and retains the scoop valve $f$ forming the bottom of the scale pan in closed position, are tripped by the projection $f^4$.

This releases the notched portions of said arms from locking engagement with the side lugs $f^5$, the scoop valve is swung open by the weight of the load and the pan delivers its contents to the delivery spout. The scoop valve $f$ will then close by gravity and the notched portions of the arms $f^3$ will again come into locking engagement with the side lugs, thus locking the scoop valve in closed position, when the pan will be ready for another load.

Having described my invention, I claim:—

1. In an automatic weighing machine, the combination with a suitable scale, of a hopper having a delivery spout; valve mechanism for controlling the feed through said spout comprising a main valve having an aperture and an auxiliary valve for closing said aperture; means for adjusting the extent of opening of the said valves; means for adjusting the size of the aperture in the main valve, and means for closing the valves successively.

2. In automatic weighing machines, the combination with two suitable scales, of a feed hopper having a plurality of delivery spouts, valve mechanism for controlling the feed from each spout to its appropriate scale, a pivoted beam adapted to be alternately moved by the movement of the scales, and means operated by the movement of said beam for alternately actuating the valves.

3. In automatic weighing machines, the combination with two suitable scales, of a feed hopper having a plurality of delivery spouts, and valve mechanism for controlling the feed from each spout to its appropriate scale, comprising a main valve provided with an aperture and an auxiliary valve closing over said aperture, the auxiliary valve being carried into open position by the main valve but adapted to close independently thereof, a pivoted beam alternately engaged and moved by the scales; means actuated by said beam adapted alternately to close the main valve of one spout and to open both the valves of the opposite spout; and means carried by said beam for independently completing its upward movement to take it out of the path of the scale during the completion of the load and before the closing of the auxiliary valve.

4. An automatic weighing machine embodying a suitable scale having a single scale beam, a scale pan mounted at one end of said beam, a hopper supported above said scale pan but mechanically independent thereof and provided with a delivery chute, a main valve and an auxiliary valve pivoted on a common pivot on said chute and adapted to control a single stream therethrough, a projection on the main valve adapted to contact with the auxiliary valve, a solenoid mounted on the hopper having its core connected to the main valve, an electro-magnet also mounted on the hopper and adapted to contact with the auxiliary valve when in open position, a switch for the solenoid and another switch for the electro-magnet located contiguous to the end of the scale beam opposite the scale pan, circuits between said switches and said solenoid and electro-magnet, and circuit closing contacts carried at the said opposite end of the scale beam.

5. An automatic weighing machine embodying a suitable scale having a single scale beam, a scale pan mounted at one end of said beam, a hopper supported above said scale pan but mechanically independent thereof and provided with a delivery chute, a main valve and an auxiliary valve pivoted on a common pivot on said chute and adapted to control a single stream therethrough, a projection on the main valve adapted to contact with the auxiliary valve, a solenoid mounted on the hopper having its core connected to the main valve, an electro-magnet also mounted on the hopper and adapted to contact with the auxiliary valve when in open position, a mercury-cup switch for the solenoid and another mercury-cup switch for the electro-magnet, circuits between said switches and said solenoid and electro-magnet, a circuit closing contact pivoted to the end of the scale beam for making and breaking the solenoid circuit and a circuit closing contact also mounted on said beam for closing and opening the circuit of the electro-magnet.

In witness whereof, I have signed my name to the foregoing specification in the presence of two subscribing witnesses.

HARRY SPENCER WEYANT.

Witnesses:
FREDERICK P. RANDOLPH,
S. M. HOLMES.